United States Patent
Giometto et al.

(10) Patent No.: US 12,504,764 B1
(45) Date of Patent: Dec. 23, 2025

(54) DETERMINING LOCAL WIND VARIABILITY FOR OPERATIONS OF AERIAL VEHICLES

(71) Applicant: Amazon Technologies, Inc., Seattle, WA (US)

(72) Inventors: Marco Giovanni Giometto, New York, NY (US); Jeffrey Massey, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 18/341,476

(22) Filed: Jun. 26, 2023

(51) Int. Cl.
 *G05D 1/00* (2024.01)
 *G01P 5/02* (2006.01)

(52) U.S. Cl.
 CPC ............. *G05D 1/1062* (2019.05); *G01P 5/02* (2013.01)

(58) Field of Classification Search
 CPC ................................. G05D 1/1062; G01P 5/02
 See application file for complete search history.

(56) References Cited

U.S. PATENT DOCUMENTS

| | | | | |
|---|---|---|---|---|
| 8,401,726 | B2 * | 3/2013 | Bouvier | G07C 5/006 701/29.4 |
| 8,554,458 | B2 | 10/2013 | Sawhill et al. | |
| 8,565,943 | B2 * | 10/2013 | Weinmann | G07C 5/008 348/148 |
| 8,620,714 | B2 * | 12/2013 | Williams | G06Q 10/0637 701/29.3 |
| 2014/0088799 | A1 | 3/2014 | Tino et al. | |
| 2017/0323274 | A1 * | 11/2017 | Johnson | G05B 13/041 |
| 2019/0101934 | A1 | 4/2019 | Tuukkanen et al. | |
| 2022/0128996 | A1 | 4/2022 | Tsurumi | |
| 2023/0306857 | A1 | 9/2023 | Hayakawa | |
| 2023/0343226 | A1 | 10/2023 | Bieringer et al. | |
| 2024/0185731 | A1 | 6/2024 | Büddefeld et al. | |

OTHER PUBLICATIONS

Cava, Daniela and Katul, Gabriel G. Spectral Short-circuiting and Wake Production within the Canopy Trunk Space of an Alpine Hardwood Forest. Boundary-Layer Meteorology, 126:415-431, 2008. ISSN 00068314. doi: 10.1007/s10546-007-9246-x. Accessed Mar. 29, 2023, URL: https://nicholas.duke.edu/people/faculty/katul/BLM_Cava_2008b.pdf.

(Continued)

*Primary Examiner* — Masud Ahmed
(74) *Attorney, Agent, or Firm* — Athorus, PLLC

(57) ABSTRACT

Data captured by wind sensors installed at various locations in a region is processed to predict a wind value representative of wind flows within the region. One or more histograms of wind flows represented in the data are generated, and continuous probability distributions (e.g., Weibull distributions) are derived based on the histograms. The wind value may represent wind flows represented in the histograms at which an aerial vehicle may be expected to encounter when performing a mission within the region. If the wind value exceeds a predetermined threshold, the aerial vehicle may be permitted to perform the mission. If the wind value does not exceed the predetermined threshold, however, the aerial vehicle may not be permitted to perform the mission.

20 Claims, 12 Drawing Sheets

(56) References Cited

OTHER PUBLICATIONS

Giometto, M. G., Christen, A., Egli, P. E., Schmid, M. F., Tooke, R. T., Coops, N. C., & Parlange, M. B. Effects of trees on mean wind, turbulence and momentum exchange within and above a real urban environment. Advances in Water Resources, 106:154-168, 2017.

Kolmogorov, Andrei Nikolaevich. The local structure of turbulence in incompressible viscous fluid for very large Reynolds numbers. Doklady Akademiia Nauk SSSR, 30:301-305, 1941. ISSN 13645021. doi: 10.1098/rspa.1991.0075. Accessed Mar. 29, 2023, URL: https://www.ams.jhu.edu/~eyink/Turbulence/classics/Kolmogorov41a.pdf.

Sorbjan, Zbigniew. Large-Eddy Simulations of the Baroclinic Mixed Layer. Boundary-Layer Meteorology, 112:57-80, 2004. ISSN 00068314. doi: 10.1023/B:BOUN.0000020161.99887.b3.

Stull, Roland B. An Introduction to Boundary Layer Meteorology. Atmospheric Sciences Library. Springer, Kluwer Academic Publishers, Dordrecht, The Netherlands, 1988. ISBN 978-90-277-2769-5. doi: 10.1007/978-94-009-3027-8.

European Centre for Medium-Range Weather Forecasts (ECMWF), available at www.ecmwf.int (last visited Mar. 29, 2024), URL: https://www.ecmwf.int/.

Global Systems Laboratory, "The High-Resolution Rapid Refresh (HRRR)," National Oceanic and Atmospheric Administration, U.S. Department of Commerce, available at URL: https://rapidrefresh.noaa.gov (last visited Mar. 29, 2024).

DeBonis, James R., "WRLES: Wave Resolving Large-Eddy Simulation Code, Theory and Usage," May 2019, Nasa/TM-2019-220192 (Year: 2019).

Gao, X-W., et al., "Free element collocation method: A new method combining advantages of finite element and mesh free methods," 2019, Computers & Structures. 215, pp. 10-26 (Year: 2019).

Wang, Biao, "Urban Wind Energy Evaluation with Urban Morphology," (vol. 101). London, UK: IntechOpen (Year: 2020).

\* cited by examiner

DETERMINING LOCAL WIND VARIABILITY FOR OPERATIONS OF AERIAL VEHICLES

BACKGROUND

The safety and reliability of aerial vehicles (e.g., unmanned aerial vehicles, or drones) that operate at low altitudes during the performance of one or more missions commonly depends on an accurate prediction of wind conditions within environments in which the aerial vehicles are intended to operate.

Unlike large-scale commercial aircraft, which operate at substantially high altitudes between takeoffs and landings, unmanned aerial vehicles travel through chaotic and unpredictable layers of the atmosphere, e.g., a roughness sublayer, which is defined as a layer between a ground surface within a region and approximately five times a height of a highest obstacle or surface feature within the region. Due to variations in height, density or other parameters of natural and artificial surface features, wind conditions over one occupied or improved property (e.g., a dwelling having a lawn, a yard or other associated open space) may differ from wind conditions of another occupied or improved property, and wind conditions over each of such properties may also vary from minute to minute.

Typically, wind conditions are determined using one or more sensors provided at a takeoff station or location. Variability of wind flows within atmospheric layers in which unmanned aerial vehicles operate may subject an unmanned aerial vehicle to a risk of violating one or more established limits at one location or time during a mission, even if the aerial vehicle complied with such limits at another location or time previously during the mission.

DETAILED DESCRIPTION

As is set forth in greater detail below, the present disclosure is directed to systems and methods for determining local wind variability. More specifically, the systems and methods of the present disclosure are directed to capturing information or data regarding wind conditions using ground-based sensors provided at discrete locations within a region or space, and processing the information or data to predict wind conditions across the region or space. Wind velocities determined at such locations may be modeled to determine or predict wind conditions across the region or space, and to make decisions as to whether an aerial vehicle may perform a mission within the region or space, or whether such conditions would render the performance of the mission by the aerial vehicle to be substandard or suboptimal.

Figure 1A:
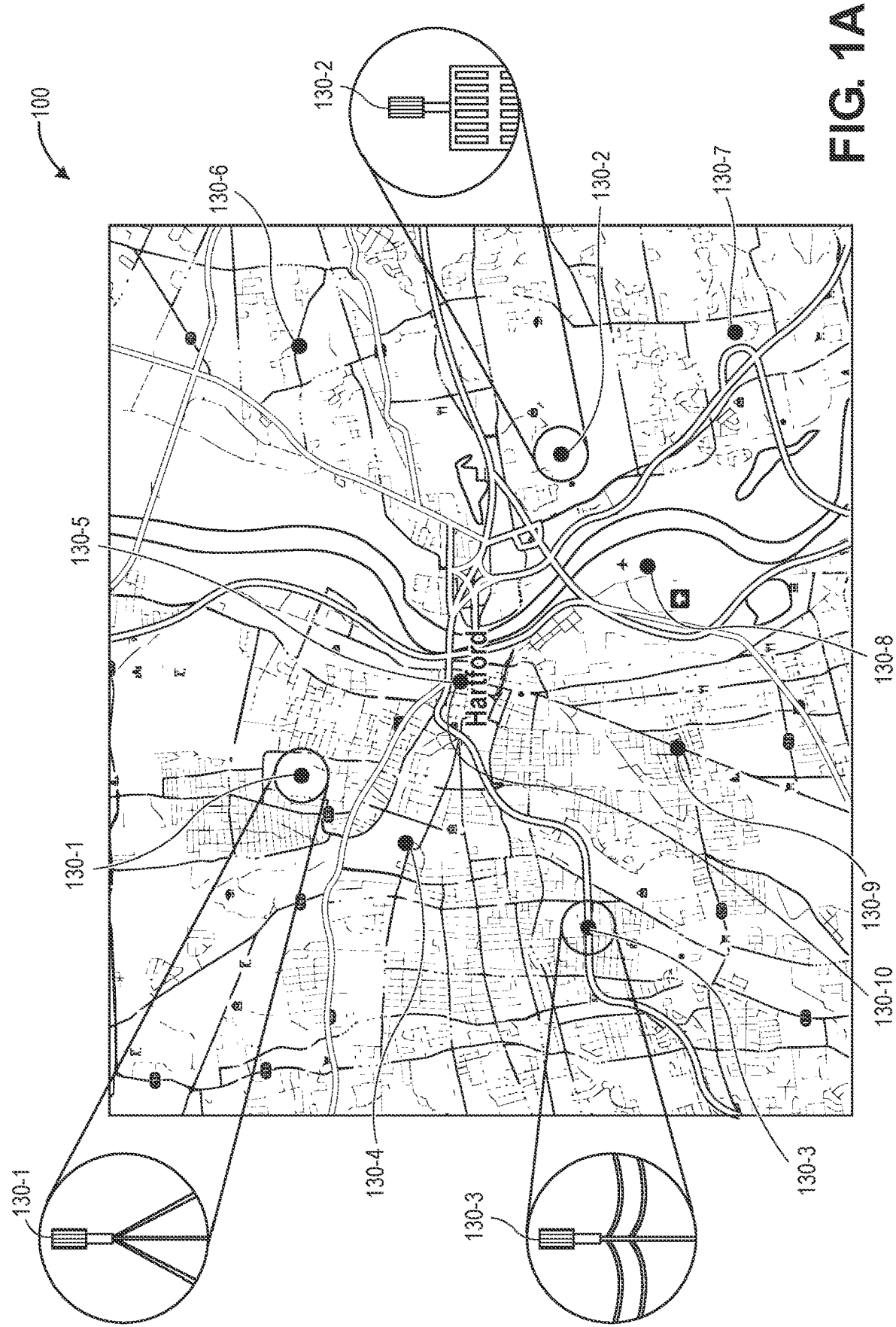
FIGS. 1A through 1H are views of aspects of one system for determining local wind variability in accordance with implementations of the present disclosure.

Referring to FIGS. 1A through 1H, views of aspects of one system for determining local wind variability in accordance with implementations of the present disclosure are shown. As is shown in FIG. 1A, an environment 100 (e.g., a region or space) in which the operation of an aerial vehicle is desired includes a plurality of weather sensors 130-1 through 130-10 distributed throughout the environment 100, which include a land area having any size or shape. For example, in some implementations, the environment 100 may be defined as a circle, an ellipse, a rectangle, a square, a triangle, or any other polygon or curvilinear shape. Additionally, the environment 100 may include a land area having any dimensions of any length. In some implementations, a land area included in the environment 100 may have dimensions (e.g., lengths of sides or circumferences) of approximately ten kilometers (or 10 km). Alternatively, the environment 100 may include a land area having any dimensions of any other length.

Additionally, the environment 100 may further include any number of buildings, structures or other artificial surface features of any type or form. For example, the environment 100 may include one or more agricultural buildings (e.g., barns, farmhouses, sheds, silos, or others), commercial buildings (e.g., automotive repair shops, cafes, car washes, convention centers, drugstores, eateries, gas stations, hotels, markets, offices, pharmacies, restaurants, shops, sports clubs, or others), educational buildings (e.g., colleges, dormitories, libraries, museums, schools, theaters or others), government buildings (e.g., city or town halls, courthouses, embassies, fire stations, police stations, post offices, or others), industrial buildings (e.g., factories, foundries, mills, power plants, warehouses or water towers), medical buildings (e.g., hospitals, nursing homes, or others), public forums (e.g., amusement parks, arenas, stadiums, theaters, or others), residential homes or other dwellings (e.g., single-family homes, apartment buildings, condominiums, dormitories, townhouses, or others), transportation centers or facilities (e.g., airports, bus stations, parking garages, terminals, train stations, or others), or any other structures. The environment 100 may also include any type or form of natural features, such as landforms (e.g., canyons, hills, mountains, valleys, or others), plant life (e.g., shrubs, trees, or any others).

The weather sensors 130-1 through 130-10 may be mounted, installed or fixed to natural or artificial features within the environment 100, or otherwise provided throughout the environment 100 in any other manner. For example, the weather sensor 130-1 is mounted to a tripod or another free-standing system, while the weather sensor 130-2 is mounted atop a building or another structure, and the weather sensor 130-3 is mounted to a utility system (e.g., a telephone pole) or another like system. The weather sensors 130-4 through 130-10 may be mounted to other systems in any other manner. In some implementations, each of the weather sensors 130-1 through 130-10 may be mounted at a common altitude or height above one or more ground surfaces, e.g., at altitudes or heights of ten meters (or 10 m), and at horizontal buffers from other natural or artificial surface features, to ensure that wind flows sensed by such sensors are standardized and clean fetch in nature. Although the environment 100 includes ten weather sensors 130-1 through 130-10, those of ordinary skill in the pertinent arts will recognize that the environment 100 may include any number or type of weather sensors in accordance with the present disclosure.

Each of the weather sensors 130-1 through 130-10 may include one or more sensing systems, e.g., anemometers (such as sonic anemometers), temperature and relative humidity probes, ceilometers, light detection and ranging systems, or others, as well as one or more processors, power sources, transceivers or other systems that enable the weather sensors 130-1 through 130-10 to capture information or data regarding weather events or conditions occurring within vicinities of such sensors, and process the information or data, or transfer the information or data to one or more external devices or systems, e.g., over one or more networks.

Figure 1B:
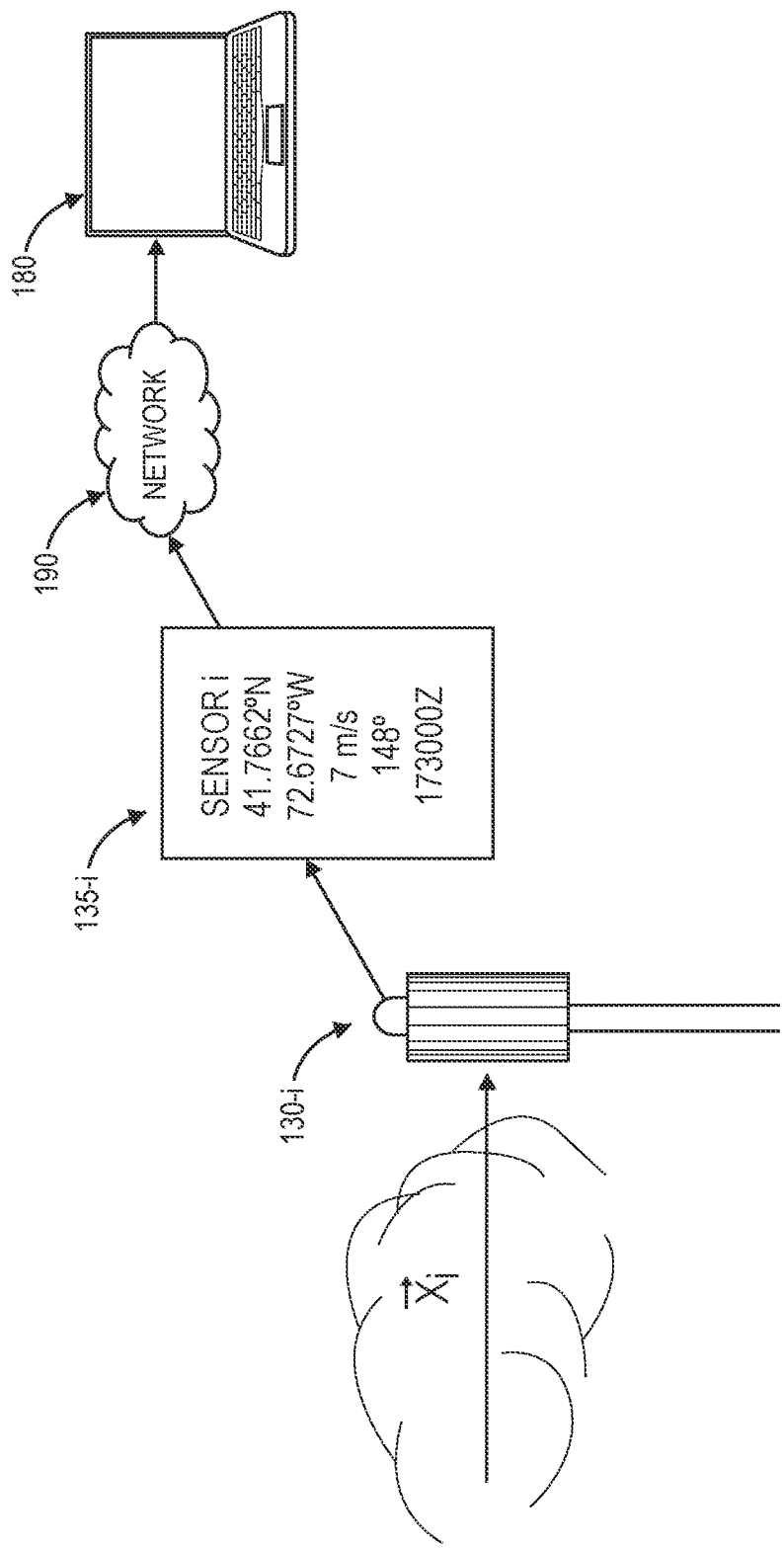

For example, as is shown in FIG. 1B, a representative weather sensor 130-i of the weather sensors 130-1 through 130-10 may be configured to capture information or data regarding a wind flow $X_i$ at a given time, e.g., intermittently or continuously, and transmit a set of data 135-i to a computer system 180 over one or more networks 190. The set of data 135-i identifies the sensor 130-i, as well as a position of the sensor 130-i, which may be represented by a latitude and a longitude, or any other sets of coordinates according to any coordinate system. The set of data 135-i further includes a velocity of the wind flow $X_i$, viz., seven meters per second (or 7 m/s) and a bearing or a direction from which the wind flow $X_i$ originated, viz., a bearing of one hundred forty-eight degrees (or 148°), as well as a time at which the wind flow $X_i$ was measured, viz., 173000Z, or five thirty p.m. in a time zone Zulu. The sensor 130-i may be configured to capture and transmit the set of data 135-i regarding the wind flow $X_i$ at any periodic interval, e.g., every one second. The set of data 135-i may include information regarding instantaneous velocities, average (e.g., rolling average) velocities, peak velocities or any other measurements or representations of velocities of winds sensed by the sensor 130-i. For example, in some implementations, the set of data 135-i may include raw data, which may be processed by the computer system 180 to determine steady wind speeds (e.g., average wind speeds) or gusts (e.g., peak wind speeds). In some other implementations, the set of data 135-i may include values of steady wind speeds or gusts calculated by one or more processors provided on the sensor 130-i.

Figure 1C:
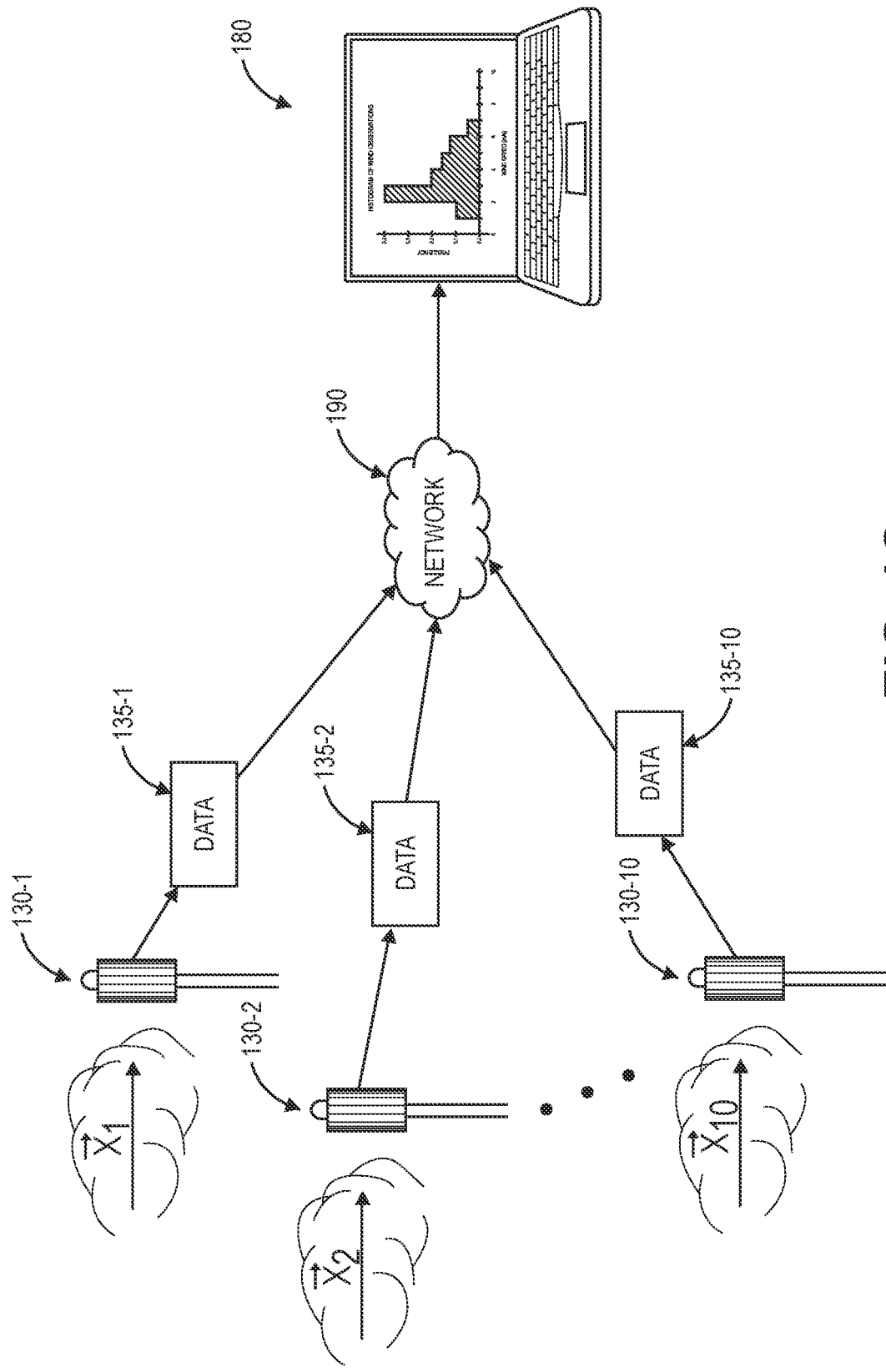

As is shown in FIG. 1C, the computer system 180 may be configured to receive sets of data 135-1 through 135-10 representative of wind flows $X_1$ through $X_{10}$ captured by each of the weather sensors 130-1 through 130-10. The sets of data 135-1 through 135-10 may include some or all of the data represented in the set of data 135-i shown in FIG. 1B, e.g., identifiers or locations of such sensors, speeds and directions of wind flows, or times at which the respective sets of data 135-1 through 135-10 were captured, or any additional or other data. The weather sensors 130-1 through 130-10 may be configured to provide the sets of data 135-1 through 135-10 continuously or at any intervals of time, e.g., one minute, two minutes, three minutes, five minutes, or other intervals.

Figure 1D:
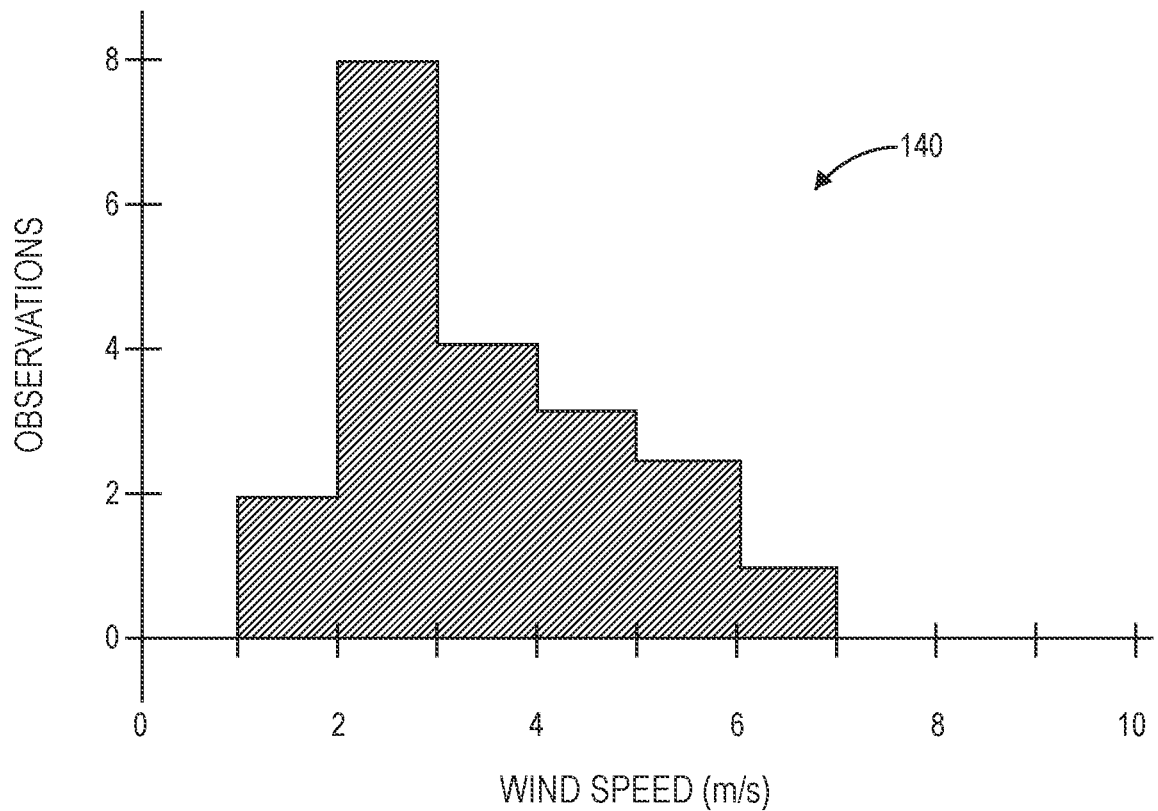

Upon receiving the sets of data 135-1 through 135-10, the computer system 180 may process the data in any manner to determine or predict wind flows across the environment. As is shown in FIG. 1D, the computer system 180 may aggregate information or data regarding observations (or occurrences) of wind flows (e.g., speeds) included in the sets of data 135-1 through 135-10 into a histogram 140. The histogram 140 identifies wind speeds observed by each of the weather sensors 130-1 through 130-10 over a predetermined period of time, e.g., fifteen minutes, or any other period, as well as frequencies with which each of the wind speeds were observed during this period. Alternatively, in some implementations, the histogram 140 may represent frequencies of observed wind speeds, which may but need not be normalized.

Although FIG. 1D shows only a single histogram 140, in some implementations multiple histograms may be generated based on the sets of data 135-1 through 135-10. For example, one histogram 140 may be generated to represent average wind speeds observed by the weather sensors 130-1 through 130-10, while another histogram 140 may be generated to represent speeds of gusts observed by the weather sensors 130-1 through 130-10.

Figure 1E:
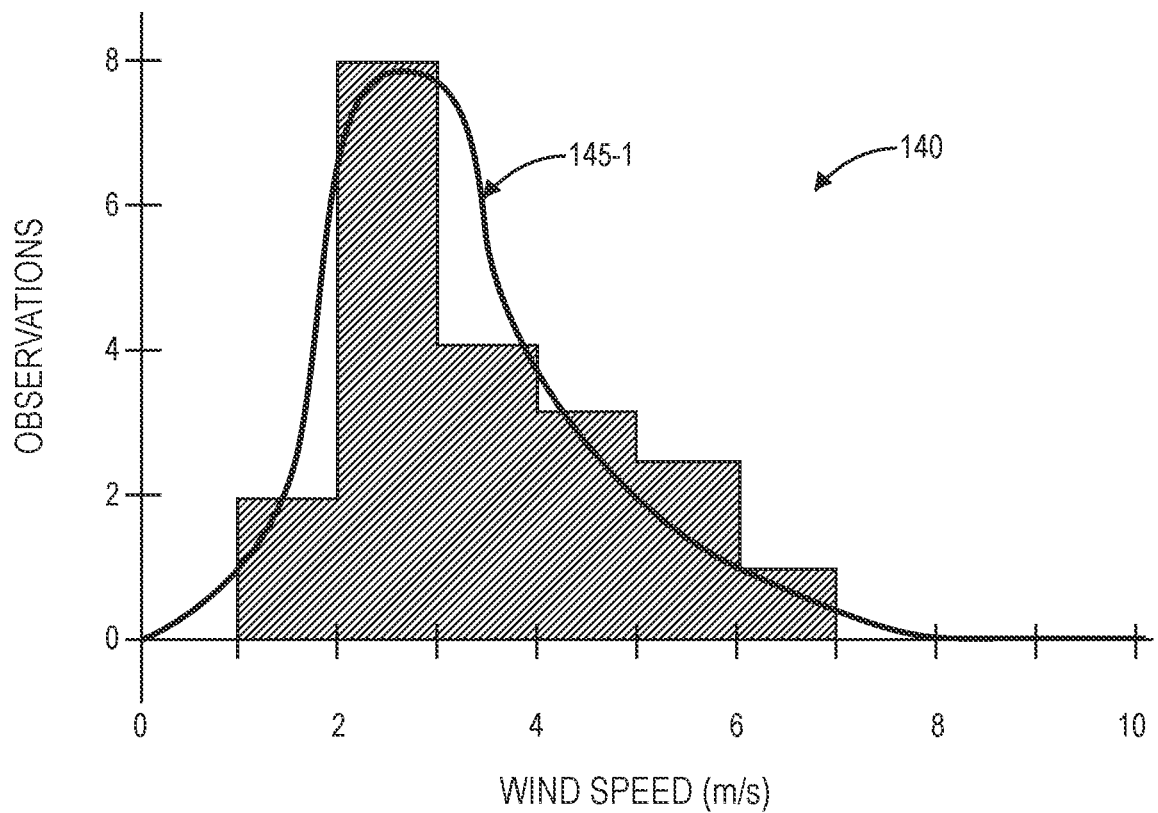

Next, as is shown in FIG. 1E, a Weibull distribution 145-1 is fit to the histogram 140. The Weibull distribution 145-1 may be a continuous probability distribution that may be generated based on the histogram according to any number of parameters. In some implementations, such parameters may relate to a shape (or a slope or a threshold) of the Weibull distribution 145-1, a scale of the Weibull distribution 145-1, or an offset (or location) of the Weibull distribution 145-1.

Figure 1F:
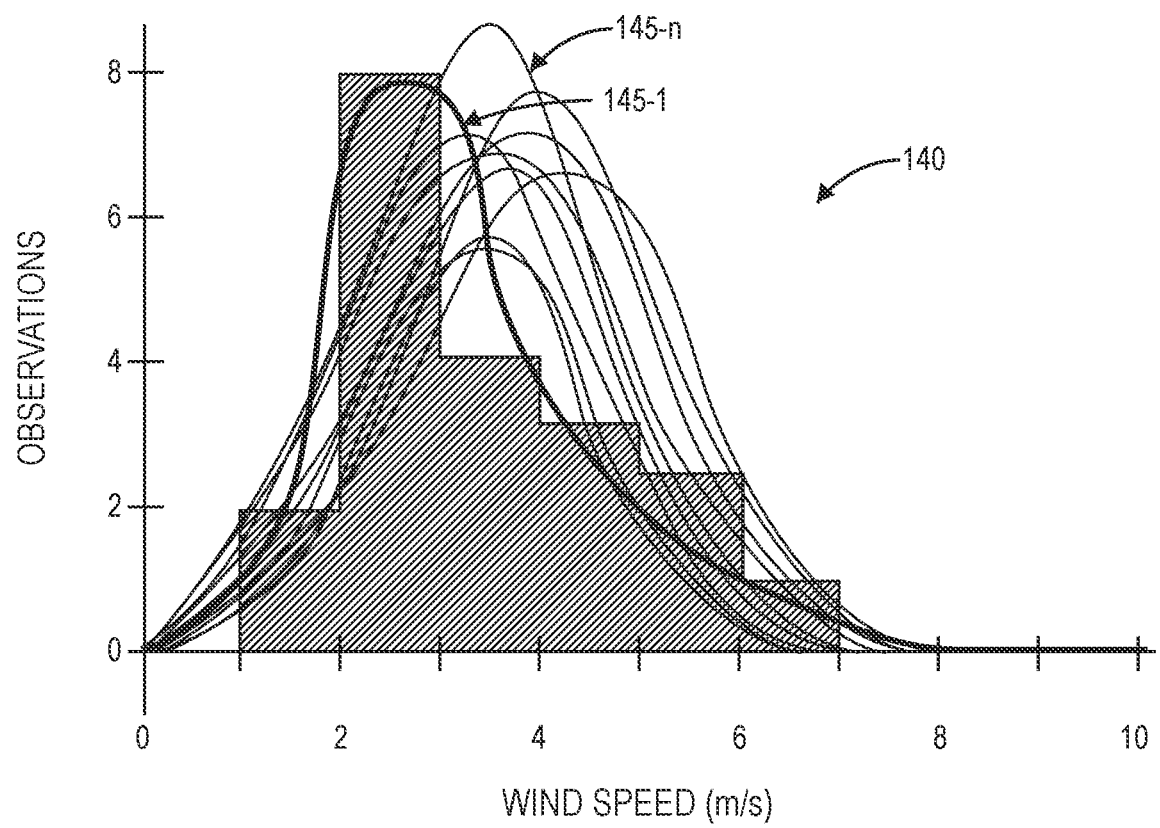

As is shown in FIG. 1F, a plurality of Weibull distributions 145-n are shown with the histogram 140 and the Weibull distribution 145-1. The Weibull distributions 145-n are obtained by resampling, or bootstrapping, the data points from which the histogram 140 and the Weibull distribution 145-1 were generated. In some implementations, in order to resample or bootstrap the Weibull distribution 145-1, a predetermined number of data points may be identified or extracted from the Weibull distribution 145-1, and another histogram may be generated from the predetermined number of data points for a predetermined number of iterations, e.g., fifty, or any other number. The Weibull distributions 145-n may be fit to the histograms generated in this manner according to any number of parameters. Furthermore, each of the Weibull distributions 145-n should surround the original Weibull distribution 145-1, such that the original Weibull distribution 145-1 is a median of the Weibull distributions 145-n.

Moreover, because the environment 100 includes just ten weather sensors 130-1 through 130-10, the sets of data 135-1 through 135-10 may be resampled by a predetermined number of iterations that may equal or differ from the number of weather stations in order to sample from an approximating distribution, e.g., from an independent and identically distributed population, by constructing a number of resamplings with variations of the sets of data 135-1 through 135-10. The resamplings may be based on the histogram 140 and each of the ten sets of data 135-1 through 135-10, or fewer than all of the sets of data 135-1 through 135-10.

Figure 1G:
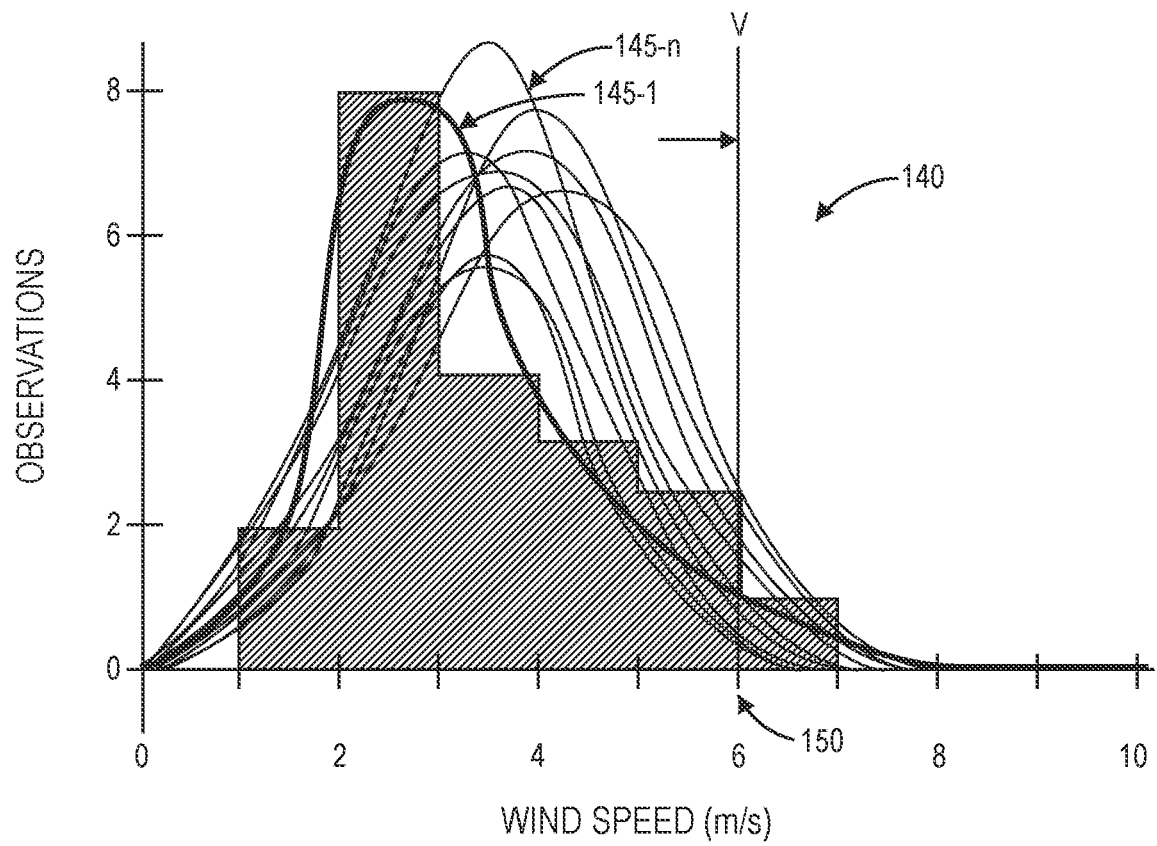

As is shown in FIG. 1G, a speed 150, or V, of wind may be selected from the Weibull distributions 145-1, 145-n. The speed 150 may represent a standard or value for which a decision (e.g., a "go" or a "no-go") as to whether to proceed with a mission within the environment 110 may be made, and may be selected based on any number of tunable parameters, and in any manner.

The speed 150 may be determined by selecting a velocity from the Weibull distributions 145-1, 145-n in any manner. In some implementations, the speed 150 may be determined as functions of one or more tunable parameters. First, the speed 150 may be selected based on a predetermined percentile of velocities of the Weibull distributions 145-1, 145-n, e.g., an eightieth (80th) percentile, an eighty-fifth (85th) percentile, a ninetieth (90th) percentile, a ninety-ninth (99th) percentile, or any other percentile, for each of the Weibull distributions 145-1, 145-n. When the speed 150 is selected in this manner, the speed 150 may thus represent a predicted percentage of the environment 100 having winds above the speed 150. Second, the speed 150 may be selected as a percentile of the velocities selected for each of the Weibull distributions 145-1, 145-n. When the speed 150 is selected in this manner, the speed 150 may thus represent a level of confidence in the percentile chosen to select such velocities. Alternatively, or additionally, the speed 150 may be selected based on any other tunable parameters.

The speed 150, or the percentiles with respect to the Weibull distributions 145-1, 145-n from which the speed 150 was selected, may be determined on any basis with respect to performance of an aerial vehicle, e.g., safety or reliability. For example, where a higher percentile is selected, the speed 150 determined based on the Weibull distributions 145-1, 145-n is greater, and a risk as to whether a mission may be performed adequately and acceptably based on the speed 150 is lower. Where a lower percentile is selected, the speed 150 is lower, and a risk that the mission will not be performed adequately or acceptably is greater.

Moreover, one or more of the percentiles or other tunable parameters by which the speed 150 is selected may vary based on location. For example, one percentile or parameter may be selected for the environment 100 based on historically observed variations in wind flows within the environment 100, and another percentile or parameter may be selected for another environment in a different location, based on historically observed variations in wind flows in that environment.

Figure 1H:
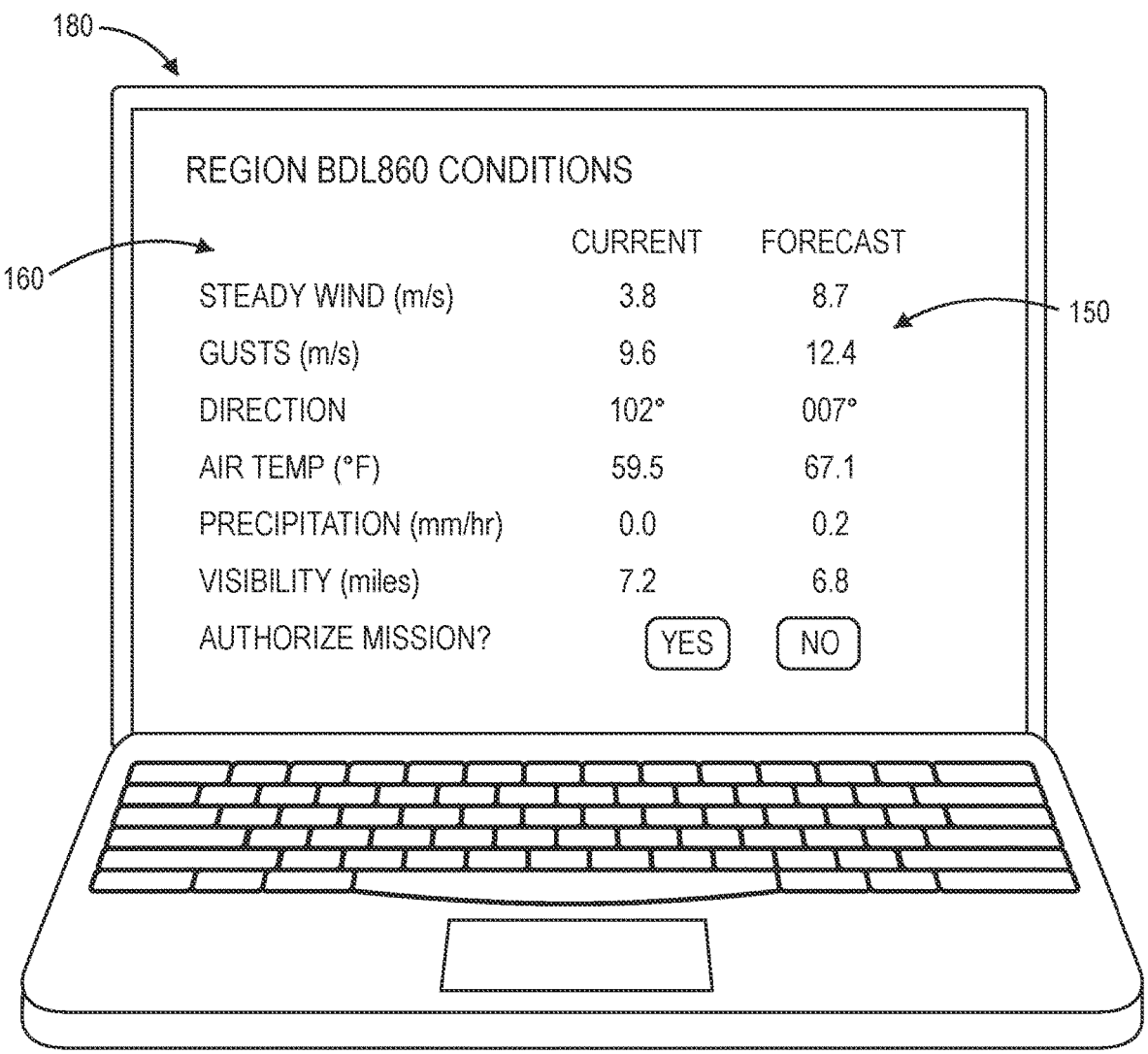

Velocities determined from histograms and continuous probability distributions may be utilized in decision-making regarding missions to be performed by aerial vehicles in the environment 100. As is shown in FIG. 1H, information regarding the speed 150 is displayed in a dashboard 160 provided on the computer system 180. The information regarding the speed 150 may include a predicted average wind speed (e.g., a steady wind speed), or a predicted gust speed, as well as a direction associated with the wind speed, anticipated air temperatures, precipitation, visibility, cloud coverage, altitudes, weather conditions (e.g., lightning), or any other information or data that may be desired or required in order to make decisions regarding the performance of missions by aerial vehicles in the environment 100.

The dashboard 160 may include one or more buttons or other interactive features enabling an operator of the computer system 180 to authorize, or to not authorize, a mission upon considering the information regarding the speed 150. The information regarding the speed 150 may further include not only current data (e.g., wind speeds or others) but also projections of the data at times in the future. Such projections may be general in nature, and may relate generally to any number of events, conditions or occurrences within the environment 100. Alternatively, projections of the data may relate to specific events, conditions or occurrences, such as specific missions (e.g., deliveries of specific items) to or from locations within the environment 100.

Furthermore, in some implementations, the information regarding the speed 150 may be derived strictly based on the sets of data 135-1 through 135-10, viz., through the histogram 140 and the Weibull distributions 145-1, 145-n. Alternatively, the information regarding the speed 150 may be derived from the sets of data 135-1 through 135-10 and also information or data obtained from other sources, such as predictive models based on data operated or managed by one or more third parties.

Figure 2:
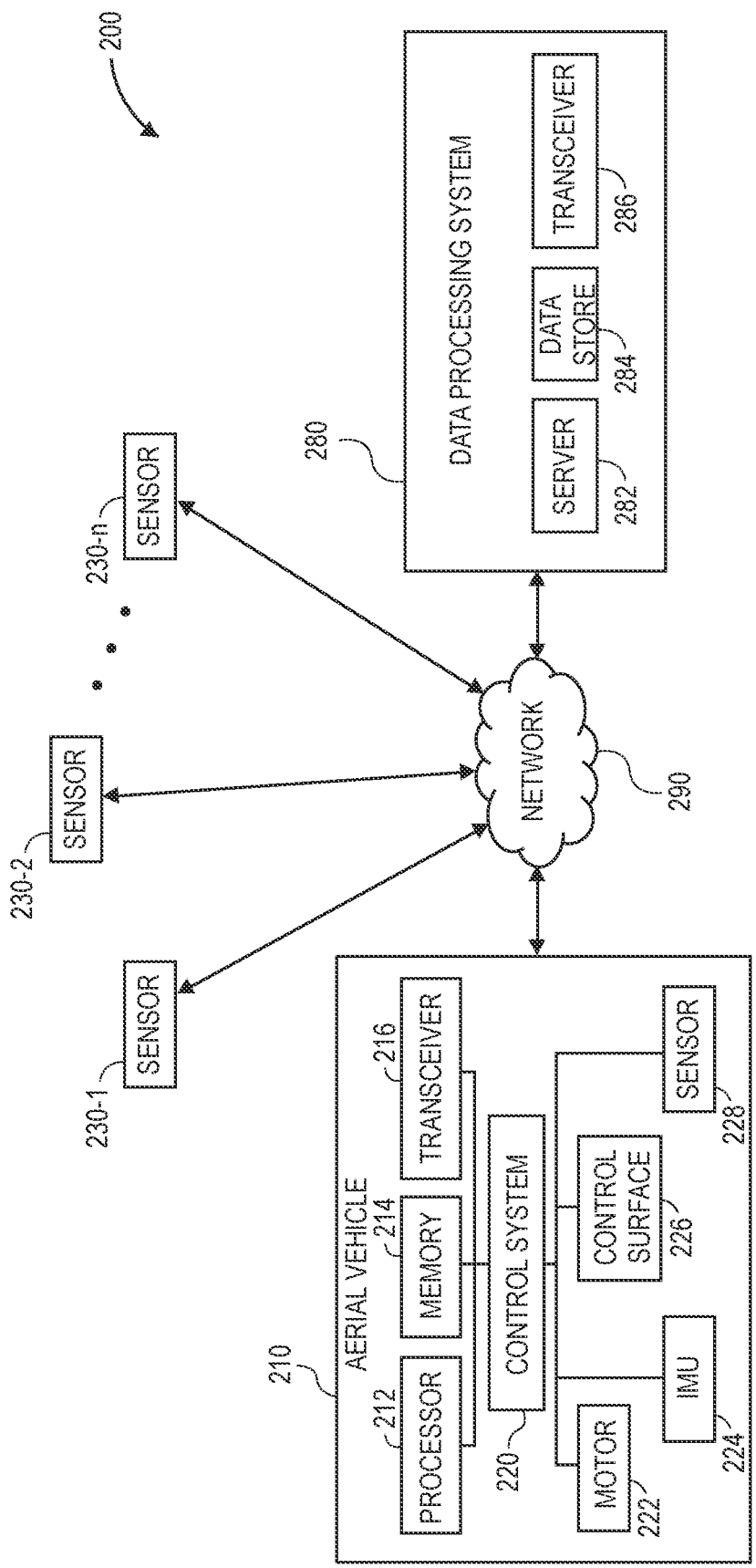
FIG. 2 is a block diagram of one system for determining local wind variability in accordance with implementations of the present disclosure.

Referring to FIG. 2, a block diagram of components of one system 200 for determining local wind variability in accordance with implementations of the present disclosure is shown. The system 200 of FIG. 2 includes an aerial vehicle 210, a plurality of weather sensors 230-1, 230-2 . . . 230-n, and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1H.

The aerial vehicle 210 includes a processor 212, a memory 214 and a transceiver 216. The aerial vehicle 210 further includes a control system 220, one or more propulsion motors 222, an inertial measurement unit (or "IMU") 224, one or more control surfaces 226 and one or more sensors 228.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques associated with one or more applications, purposes or functions of the aerial vehicle 210, or to select at least one of a course, a speed or an altitude for the operation of the aerial vehicle 210. For example, the processor 212 may be configured to control any aspects of the operation of the aerial vehicle 210 and the one or more computer-based components thereon, including but not limited to the motors 222, the inertial measurement unit 224, the control surfaces 226 or the sensors 228.

The processor 212 may also control the operation of one or more control systems or modules, such as the control system 220, for generating instructions for conducting operations of one or more of the propulsion motors 222, the inertial measurement unit 224, or the control surfaces 226, or for interpreting information or data captured by the sensors 228. Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some implementations, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some implementations, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some implementations, the transceiver 216 may be configured to coordinate I/O traffic between the processor 212 and one or more onboard or external computer devices or components, e.g., the motors 222, the inertial measurement unit 224, the control surfaces 226 or the sensors 228, or any other devices or components (not shown). The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the motors 222, the inertial measurement unit 224, the control surfaces 226 or the sensors 228, or other components, such as to cause one or more of the motors 222 to rotate propellers at desired speeds or to cause such propellers to be aligned in selected positions or orientations. The control system 220 may further control any other aspects of the aerial vehicle 210, including but not limited to the operation of one or more aspects of the control surfaces 226, which may include wings, rudders, ailerons, elevators, flaps, brakes, slats or other features within desired ranges, or the enactment with or release of one or more items by one or more engagement systems (not shown). The control system 220 may also interpret data captured or signals generated by the inertial measurement unit 224, or the sensors 228. In some implementations, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some implementations, one or more of the motors 222 may be a brushless DC multi-phase motor such as an outrunner brushless motor or an inrunner brushless motor.

The aerial vehicle 210 may include any number of motors 222 of any kind. For example, one or more of the motors 222 may be aligned or configured to provide forces of lift to the aerial vehicle 210, exclusively, while one or more of the motors 222 may be aligned or configured to provide forces of thrust to the aerial vehicle 210, exclusively. Alternatively, one or more of the motors 222 may be aligned or configured to provide forces of lift and forces of thrust to the aerial vehicle 210, as needed. For example, the motors 222 may be fixed in their orientation on the aerial vehicle 210, or configured to vary their respective orientations, e.g., a tilt-rotor aircraft. Moreover, the motors 222 may be aligned or configured to operate with different capacities or ratings, or at different speeds, or coupled to propellers having different sizes and shapes. For example, in some implementations, one or more of the motors 222 may be an electric motor, e.g., a brushless DC multi-phase motor, and one or more of the motors 222 may be a gasoline-powered motor.

Each of the motors 222 may be coupled to one or more propellers (or rotors or rotatable systems) having a plurality of shaped blades joined to a hub or boss. For example, each of such propellers may be rotatably mounted to a mast or shaft associated with a respective one of the motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some implementations, one or more propellers may be configured to rotate about a vertical axis, and to provide forces of lift in a vertical direction (e.g., upward) accordingly. In some other implementations, one or more of the propellers may be configured to rotate about a horizontal axis, and to provide forces of thrust in a horizontal direction (e.g., forward) accordingly. In still other implementations, one or more of the propellers may be configured to rotate about axes that are neither horizontal nor vertical, and to provide forces of lift and/or thrust in directions corresponding to such axes accordingly.

The inertial measurement unit 224 may be any type or form of onboard device for sensing changes in linear or rotational motion of the aerial vehicle 210. In some implementations, the inertial measurement unit 224 may include one or more gyroscopes, one or more accelerometers, one or more compasses (or other magnetometer), and a Global Positioning System ("GPS") transceiver. In some implementations, the inertial measurement unit 224 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other implementations, however, the inertial measurement unit 224 may be strapped or mounted to an object suspended within the aerial vehicle 210.

Gyroscopes of the inertial measurement unit 224 may be any mechanical or electrical device, component, system, or instrument for determining an orientation, e.g., the orientation of the aerial vehicle 210. For example, the gyroscopes may be traditional mechanical gyroscopes, each having at least a pair of gimbals and a flywheel or rotor. Alternatively, the gyroscopes may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the aerial vehicle 210. In some implementations, the gyroscopes may generate angular rate data in any direction or along or about any axis.

Accelerometers of the inertial measurement unit 224 may be any mechanical or electrical devices, components, systems, or instruments for sensing or measuring accelerations, including but not limited to devices having one or more potentiometers, linear variable differential transformers, variable reluctance devices or piezoelectric components. For example, in some implementations, the accelerometers may be configured to capture acceleration data in any direction or along or about any axis, e.g., a triaxial accelerometer. The gyroscopes and/or the accelerometers of the inertial measurement unit 224 may be configured to generate angular rate data or acceleration data, respectively, at any rate or frequency, such as at frequencies ranging from zero to five hundred Hertz (0-500 Hz) or at frequencies greater than five hundred hertz (500 Hz).

Compasses of the inertial measurement unit 224 may be any devices, components, systems, or instruments adapted to determine one or more directions with respect to a frame of reference that is fixed with respect to the surface of the Earth (e.g., a pole thereof). For example, the compasses may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). GPS transceivers may be any devices, components, systems, or instruments adapted to receive signals (e.g., trilateration data or information) relating to a position of the inertial measurement unit 224 from one or more GPS satellites of a GPS network (not shown), or for reporting the position of the inertial measurement unit 224 determined based on such signals. Alternatively, the GPS transceivers may be any devices or components for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data). Geolocations of the GPS transceivers or the inertial measurement unit 224 may be associated with the aerial vehicle 210, where appropriate.

In some implementations, the inertial measurement unit 224 may further include any number of computer components, e.g., one or more processors, memory components and/or transceivers (not shown), or any other components for aiding in the determination of accelerations, velocities, positions and/or orientations.

The control surfaces 226 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. In some implementations, each of the control surfaces 226 may include a motor, such as an electrical, mechanical and/or hydraulic or other component or actuator for rotating, translating or otherwise repositioning or reorienting a respective one of the control surfaces 226 during operation of the aerial vehicle 210, under the control of the one or more processors 212 or the control system 220. In some implementations, each of the control surfaces 226 may include a directional sensor, such as any type of sensor or other component that is embedded into one or more aspects of one of the control surfaces 226 (e.g., a leading edge, a trailing edge, a tip or one or more other faces or aspects of such surfaces 226) and configured to gather information or data with respect to an alignment or orientation thereof. For example, one of the control surfaces 226 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

The sensors 228 may be any devices, systems or components that are configured to capture data regarding the aerial vehicle 210, or its surroundings, as the aerial vehicle 210 is engaged in operations or testing, or at any other time. In some implementations, the sensors 228 may include any number of sensors, e.g., a suite of such sensors, of any type or form. For example, the sensors 228 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 228 may be configured to capture or detect reflected light if the reflected light is within a field of view of the sensors 228, which is defined as a function of a distance between an imaging sensor and a lens within the sensors 228, viz., a focal length, as well as a position of the sensors 228 and an angular orientation of the lens. Accordingly, where an object appears within a depth of field, or a distance within the field of view where the clarity and focus is sufficiently sharp, the sensors 228 may capture light that is reflected off objects of any kind to a sufficiently high degree of resolution using one or more sensors thereof, and store information regarding the reflected light in one or more data files.

The sensors 228 may also include manual or automatic features for modifying a field of view or orientation. For example, the sensors 228 may be a digital camera configured in a fixed position, or with a fixed focal length (e.g., fixed-focus lenses) or angular orientation. Alternatively, the sensors 228 may include one or more actuated or motorized features for adjusting a position of the sensors 228, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 228, or a change in one or more of the angles defining the angular orientation of the sensors 228.

For example, the sensors 228 may be an imaging device that is hard-mounted to the aerial vehicle 210 in a fixed configuration or angle with respect to one, two or three axes. Alternatively, however, the sensors 228 may be provided with one or more motors and/or controllers for manually or automatically operating one or more of the components, or for reorienting the axis or direction of the sensors 228, i.e., by panning or tilting the sensors 228. Panning the sensors 228 may cause a rotation within a horizontal plane or about a vertical axis (e.g., a yaw), while tilting the sensors 228 may cause a rotation within a vertical plane or about a horizontal axis (e.g., a pitch). Additionally, the sensors 228 may be rolled, or rotated about its axis of rotation, and within a plane that is perpendicular to the axis of rotation and substantially parallel to a field of view of the sensors 228.

Imaging data (e.g., still or moving images, as well as associated audio data or metadata) captured using the sensors 228 may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 228 may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 228 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 228, may be derived, and the net vector may include any other values associated with information or data captured by any of the sensors 228, e.g., images, sounds, or the like. Additionally, coefficients or scalars indicative of the relative movements of the aerial vehicle 210 may also be defined.

Although the aerial vehicle 210 shown in the block diagram of FIG. 2 includes a single box for a motor 222, a single box for an inertial measurement unit 224, a single box for a control surface 226, and a single box for a sensor 228, those of ordinary skill in the pertinent arts will recognize that any number or type of motors, inertial measurement units (or components thereof), control surfaces or sensors may be provided aboard the aerial vehicle 210 in accordance with the present disclosure. Alternatively, in some implementations, the aerial vehicle 210 may be a ground vehicle or any other object. The systems and methods of the present disclosure are not limited for use in connection with aerial vehicles.

As is shown in FIG. 2, the system 200 further includes the plurality of weather sensors 230-1, 230-2 . . . 230-n. Each of the weather sensors 230-1, 230-2 . . . 230-n may include any number of components for capturing, processing or transmitting information or data regarding weather conditions provided in a frame, a housing or another structure of any shape or size. For example, in some implementations, the weather sensors 230-1, 230-2 . . . 230-n may include an anemometer (e.g., a sonic anemometer) configured to measure or determine wind speeds in any direction, or in one or more axial directions. The weather sensors 230-1, 230-2 . . . 230-n may further include any number of processors, memory components, or other components which may be provided on a printed circuit board assembly, or on any other system. The weather sensors 230-1, 230-2 . . . 230-n may be configured to receive power from one or more external sources, e.g., by one or more wires, or may include one or more internal power sources such as batteries, fuel cells, solar cells, or others. The weather sensors 230-1, 230-2 . . . 230-n may also include transceivers for communicating via wired or wireless means, e.g., wired technologies such as USB or fiber optic cable, or standard wireless protocols or technologies such as cellular, Bluetooth® or any Wi-Fi protocol.

Although the system 200 shown in the block diagram of FIG. 2 includes three boxes for weather sensors 230-1, 230-2 . . . 230-n, those of ordinary skill in the pertinent arts will recognize that any number or type of weather sensors may be utilized in accordance with the present disclosure.

As is shown in FIG. 2, the data processing system 280 includes one or more physical computer servers 282 having one or more data stores 284 and one or more transceivers 286 associated therewith, and may be provided for any specific or general purpose. For example, the data processing system 280 may be independently provided for the exclusive purpose of receiving, analyzing or storing information or data received from the aerial vehicle 210 or the weather sensors 230-1, 230-2 . . . 230-n. Alternatively, the data processing system 280 of FIG. 2 may be provided in connection with one or more physical or virtual services configured to receive, analyze or store such information or data, as well as one or more other functions.

In some implementations, the data processing system 280 may be configured to perform, execute or solve any number of mathematical formulas, equations or relationships. For example, in some implementations, the data processing system 280 may be configured to execute one or more differential equations, e.g., partial differential equations, or solve for any relationships. In some implementations, the data processing system 280 may be configured to execute any number of simulations or modeling techniques, such as by simulating the presence or absence of any obstacles such as buildings within an outdoor environment, or modeling flow of air from any direction and at any velocity over or between such obstacles. For example, in some implementations, the data processing system 280 may be configured to construct surrogate environments (or synthetic environments) and select flow regimes or conditions subject to any number or set of rules, or on any other basis, and may simulate flow conditions according to one or more simulations, e.g., computational fluid dynamics simulations such as large-eddy simulations or others. The flow conditions may be simulated by solving for any calculations to predict wind flows at various locations within computational domains.

The servers 282 may be connected to or otherwise communicate with the data stores 284 and the transceiver 286. The data stores 284 may store any type of information or data, including but not limited to information or data received from the aerial vehicle 210, from the weather sensors 230-1, 230-2 . . . 230-*n*, or from any other source, for any purpose. The transceiver 286 may share any of the features, properties or attributes of the transceiver 216 described above, or may have one or more different features, properties or attributes. The servers 282 and/or the transceiver 286 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, from the weather sensors 230-1, 230-2 . . . 230-*n*, or from one another, or from one or more other external computer systems (not shown) via the network 290. In some implementations, the data processing system 280 may be provided in a physical location. In other such implementations, the data processing system 280 may be provided in one or more alternate or virtual locations, e.g., in a "cloud"-based environment. In still other implementations, the data processing system 280 may be provided onboard one or more aerial vehicles, including but not limited to the aerial vehicle 210, or in association with any of the weather sensors 230-1, 230-2 . . . 230-*n*.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the weather sensors 230-1, 230-2 . . . 230-*n*, or the data processing system 280 may use any web-enabled or Internet applications or features, or any other client-server applications or features including E-mail or other messaging techniques, to connect to the network 290, or to communicate with one another. For example, the aerial vehicle 210 or the weather sensors 230-1, 230-2 . . . 230-*n* may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the weather sensors 230-1, 230-2 . . . 230-*n* or the data processing system 280 may operate, include or be associated with any of a number of computing devices that are capable of communicating over the network 290. The protocols and components for providing communication between such devices are well known to those skilled in the art of computer communications and need not be described in more detail herein.

Data and/or computer-executable instructions, programs, firmware, software and the like described herein may be stored on a computer-readable medium that is within or accessible by computers or computer components such as the processor 212 or the server 282, or any other computers or control systems utilized by the aerial vehicle 210, the weather sensors 230-1, 230-2 . . . 230-*n* or the data processing system 280, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
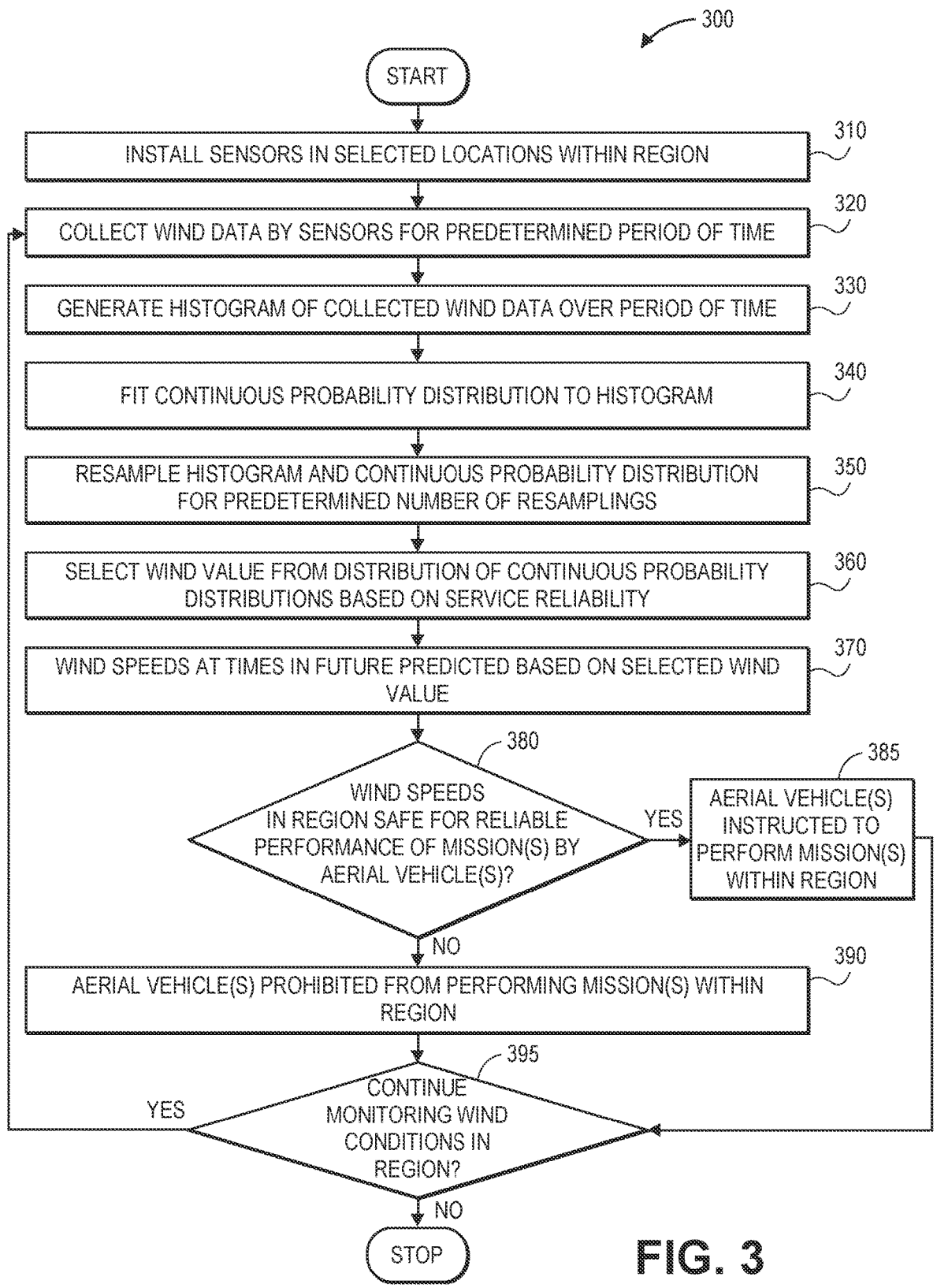
FIG. 3 is a flow chart of one process for determining local wind variability in accordance with implementations of the present disclosure.

Referring to FIG. 3, a flow chart 300 of one process for determining local wind variability in accordance with implementations of the present disclosure is shown.

At box 310, a plurality of sensors are installed at one or more selected locations within a region. In some implementations, each of the sensors may include one or more anemometers or other components for sensing wind conditions within a vicinity of the sensor, as well as any number of processors, memory components, transceivers or other systems for capturing, processing or transmitting data to one or more external systems (not shown). In some implementations, the sensors may be configured to communicate via wired or wireless means, e.g., wired technologies such as USB or fiber optic cable, or standard wireless protocols or technologies such as cellular, Bluetooth® or any Wi-Fi protocol. The sensors may include housings formed from plastics, composites, metals or other materials, and may operate based on electrical power obtained from one or more external sources, e.g., by one or more wires, or from one or more internal power sources such as batteries, fuel cells, solar cells, or others.

Alternatively, such sensors may include one or more other components for determining information or data regarding weather or other environmental conditions, such as rain gauges, illuminance meters, thermometers, ceilometers, barometers, or other features.

The sensors may be installed by mounting the sensors to one or more fixed or mobile components such as bridges, buildings, stanchions, utility systems (e.g., telephone poles or cellular towers), or other features, which may be provided on public or private property.

At box 320, wind data is collected by the sensors for a predetermined period of time. Sets of wind data collected by the sensors may be processed by one or more processor units of the respective sensors, or transmitted to one or more external computer systems over one or more networks. In some implementations, the wind data may be captured at regular intervals, e.g., every one second. The wind data may include rolling, steady winds or gusts recorded over predetermined periods of time, e.g., five to ten minutes in duration, and may be reported at regular intervals, e.g., one minute, five minutes, ten minutes, fifteen minutes, or others.

At box 330, a histogram of the wind data collected over the period of time is generated. For example, in some implementations, the wind data may be aggregated into sets or bins corresponding to intervals or unit speeds, e.g., of one meter per second (1 m/s) or on any other basis. The sets or bins represent numbers of wind occurrences that involved speeds within each of such bins. For example, where the wind data represents wind flows with speeds ranging between zero and ten meters per second, the histogram may indicate numbers of wind occurrences having speeds ranging between zero and one meter per second, between one and two meters per second, between two and three meters per second, and so on and so forth, for each one meter per second interval.

In some implementations, a single histogram may be generated based on the wind data collected over the period of time. In some other implementations, however, two or more histograms may be generated based on the wind data collected over the period of time. For example, one histogram representing wind occurrences involving rolling, steady winds may be generated based on the wind data, and another histogram may be generated representing wind occurrences including gusts may be generated based on the wind data.

In addition to generating histograms, the wind data may be processed in any other manner to determine one or more statistics or other attributes of the wind data. For example, the wind data may be processed to determine averages of wind speeds (e.g., rolling, steady winds or gusts), standard deviations of such wind speeds, or any other data.

At box 340, a continuous probability distribution is fit to the histogram. For example, the continuous probability distribution may be a Weibull distribution, or any other continuous probability distribution, that may be fit to the histogram in any manner. In some implementations, the continuous probability distribution may be fit to the histogram according to any number of parameters, any of which may relate to a shape (or a slope or a threshold) of the continuous probability distribution, a scale of the continuous probability distribution, or an offset (or location) of the Weibull distribution. A quality of a fit of the continuous probability distribution to the histogram may be determined visually, according to a linear regression, or in any other manner.

At box 350, the histogram and the continuous probability distribution are resampled for a predetermined number of resamplings. For example, in some implementations, the histogram and the continuous probability distribution may be bootstrapped or otherwise resampled using each of the sets of data received from the sensors at box 320, or fewer than all of such sets. In some implementations, the histogram and the continuous probability distribution may be resampled based on each of the sets of data received from the sensors at box 320, and with one or more of such sets of data being considered twice or more often.

At box 360, a wind value is selected from a distribution of the continuous probability distributions based on service reliability. For example, the wind value may be a representative speed over the operating region selected based on the histogram and the continuous probability distributions. The wind value may be selected based on a percentile of each distribution of each of the continuous probability distributions over the operating region, e.g., a substantially high percentile, such as an eightieth percentile, an eighty-fifth percentile, a ninetieth percentile, or a ninety-ninth percentile, to nearly approximate a maximum wind flow that may be reasonably anticipated within an environment or an operating region during operation of an aerial vehicle. The percentile of the wind speeds by which the wind value is selected may be optimized to maximize the service availability within the environment or operating region but to minimize a risk of flying during wind excursions. The wind value may also be selected based on a percentile of the wind speeds of the percentiles of the distributions, which may represent a level of confidence in the percentile chosen to select the wind speeds.

In some implementations, a single wind value may be selected from the distribution of the continuous probability distributions. In some other implementations, such as where two or more histograms are generated from the sets of data received from the sensors at box 320, e.g., a first histogram for rolling, steady winds and a second histogram for wind gusts, two or more wind values may be selected from distributions of continuous probability distributions for the respective histograms.

At box 370, wind speeds are predicted at future times based on the selected wind value determined at box 360. For example, in some implementations, mean wind flows or standard deviations of wind flows may be determined indirectly from the histograms generated at box 330, or directly from the sets of data captured at box 320. The mean wind flows or standard deviations of the wind flows may be provided to a model, e.g., a machine learning model such as a gradient-boosted decision tree, that may be trained to generate forecasts of wind speeds and wind gusts based on such means or standard deviations.

In some implementations, a model may be trained to generate predictions of wind speeds and wind gusts across a region at future times based on mean wind flows or standard deviations of wind flows determined from wind data captured by sensors distributed across the region at previous times. For example, where wind speeds and wind gusts are captured at predetermined increments, e.g., five minutes, ten minutes, fifteen minutes or other increments, such wind speeds and wind gusts may be provided as inputs to a model that is trained to predict wind speeds or wind gusts at predetermined times in the future, such as five minutes, ten minutes, fifteen minutes, or other times, and such speeds or gusts may be predicted based on outputs received in response to such inputs.

In some other implementations, a model may be trained to generate predictions of wind speeds and wind gusts across a region at future times based not only on mean wind flows or standard deviations of wind flows determined from actual wind data captured by sensors but also mean wind flows or standard deviations of wind flows predicted at future times by other techniques. For example, where a third party or external service or system generates predictions of wind speeds or wind gusts at various times in the future, information or data regarding observed wind speeds or wind gusts and information or data regarding the predicted wind speeds or wind gusts may be provided as inputs to a model that is trained to predict wind speeds or wind gusts at predetermined times in the future, such as five minutes, ten minutes, fifteen minutes, or other times, and such speeds or gusts may be predicted based on outputs received in response to such inputs.

In some implementations, future times at which wind speeds and wind gusts are predicted may be selected on any basis, such as one or more attributes of missions that are expected to be performed at such times. Where a mission is expected to last for a predetermined duration, one or more future times at which wind speeds and wind gusts are predicted may be selected based on the predetermined duration of the mission. Where a mission is expected to require one or more actions prior to takeoff, one or more future times at which wind speeds and wind gusts are predicted may be selected based on times required to complete each of the actions.

At box 380, whether one or more missions may be safely and reliably performed within the region is determined based on the predicted wind speeds. For example, where the wind value selected at box 360 or the wind speeds predicted at the future times at box 370 are less than a predetermined limit or threshold, an environment may be presumed to be safe for the reliable performance of one or more missions by aerial vehicles. Alternatively, where the wind value selected at box 360 or the wind speeds predicted at the future times at box 370 are above the predetermined limit or threshold, the environment may be presumed to be unsafe for the reliable performance of one or more missions by aerial vehicles.

The limits or thresholds by which predictions of safety or reliability of missions are made may be selected on any basis. For example, such limits or thresholds may be selected for a single aerial vehicle, or a single class of aerial vehicles, e.g., based on design requirements or features of the aerial vehicle or the class. The limits or thresholds may also be selected for a single region, or for multiple regions, based on attributes or features of the region or regions. The limits or thresholds may also be established by one or more government agencies, or in accordance with one or more laws, statutes, ordinances or regulations. Alternatively, the limits or thresholds may be selected on any other basis.

If missions may be safely and reliably performed by aerial vehicles within the region based on the wind speeds, then the process advances to box 385, where one or more aerial vehicles are instructed to perform such missions. For example, in some implementations, information regarding the predicted wind speeds or wind gusts may be displayed by a computer device or system, e.g., in a dashboard or another user interface, and an operator of the computer device or system may authorize an aerial vehicle to perform a mission, or decline to authorize the aerial vehicle to perform the mission, by one or more interactions with the dashboard or user interface. Subsequently, one or more sets of instructions for performing the mission may be generated and transmitted to an aerial vehicle. Such instructions may identify a route to be followed by the aerial vehicle, or a plurality of waypoints through which the aerial vehicle is to travel while performing the mission, or include any other information or data required for the aerial vehicle to perform the mission.

Alternatively, if missions may not be safely or reliably performed by aerial vehicles within the region, then the process advances to box 390, where aerial vehicles are prohibited from performing any missions within the region.

After aerial vehicles have been prohibited from performing missions within the region, or after such aerial vehicles have been instructed to perform missions, then the process advances to box 395, where whether the continued monitoring of wind conditions in the region is desired is determined. If the continued monitoring of wind conditions in the region is desired, then the process returns to box 320, where wind data is again collected by the sensors for the predetermined period of time. Sets of wind data may be continuously captured, transmitted and processed for as long as is required or desired, and utilized to determine whether missions may be safely or reliably performed accordingly. If the continued monitoring of wind conditions in the region is not desired, then the process ends.

Figure 4A:
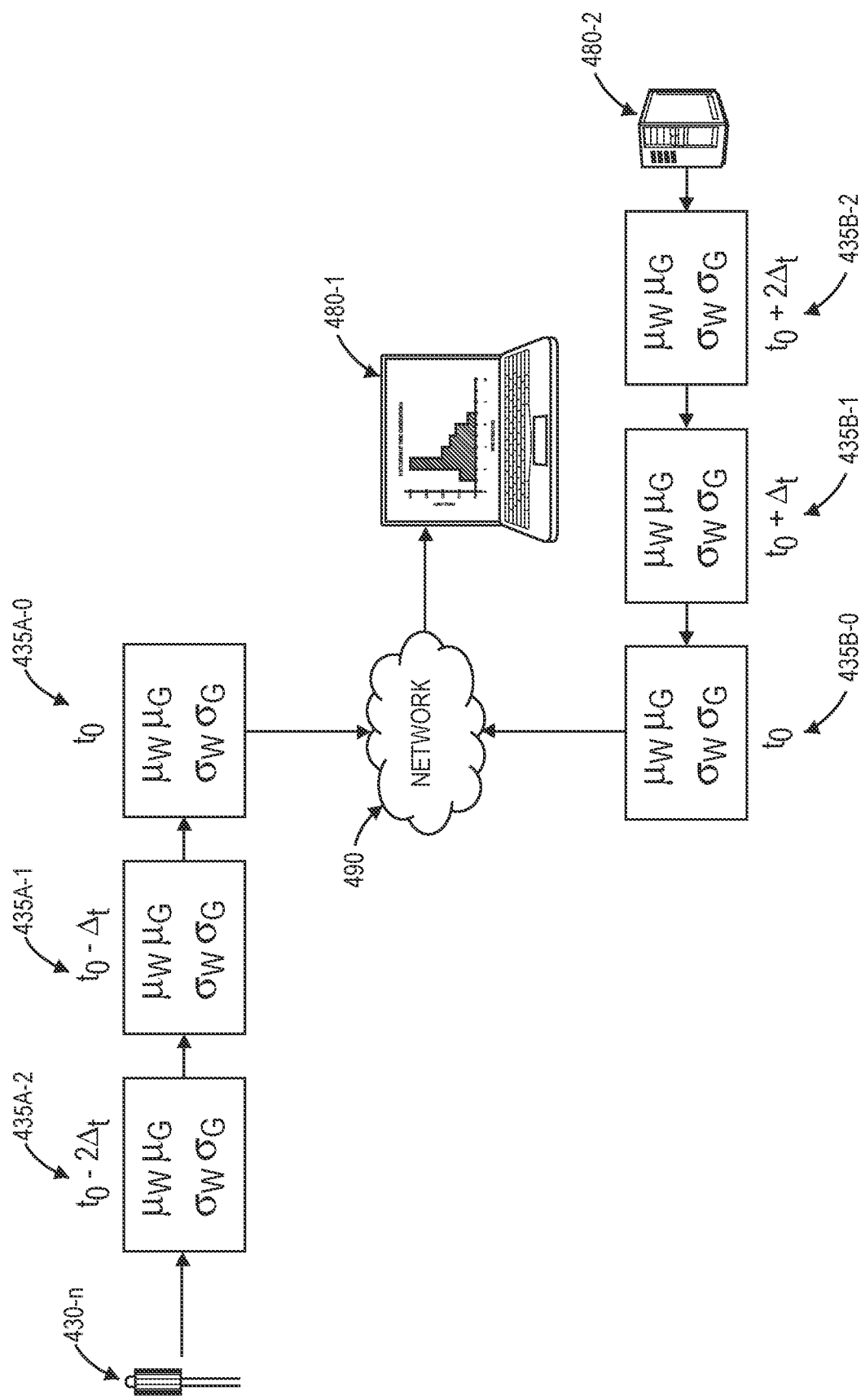
FIGS. 4A and 4B are views of aspects of one system for determining local wind variability in accordance with implementations of the present disclosure.
Figure 4B:
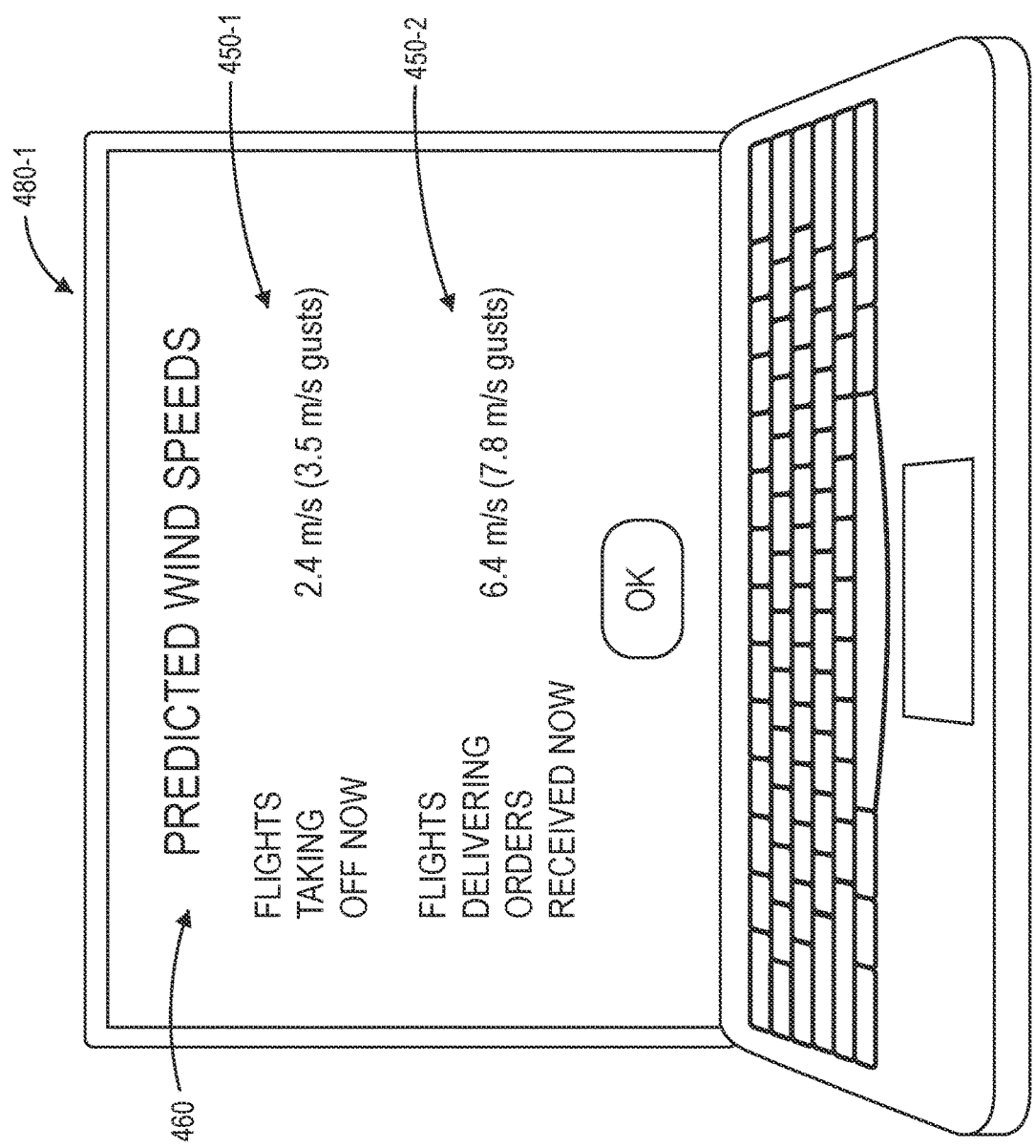

As is discussed above, predictions of wind speeds may be determined based on observed wind speeds or gusts and also other predictions, which may be provided as inputs to one or more models trained to generate such predictions. Referring to FIGS. 4A and 4B, views of aspects of one system for determining local wind variability in accordance with implementations of the present disclosure are shown. Except where otherwise noted, reference numerals preceded by the number "4" shown in FIGS. 4A and 4B indicate components or features that are similar to components or features having reference numerals preceded by the number "2" shown in FIG. 2 or by the number "1" shown in FIGS. 1A through 1H.

As is shown in FIG. 4A, a plurality of weather sensors 430-$n$ may transmit sets of data 435A-0, 435A-1, 435A-2 regarding wind flows (e.g., rolling, steady winds and gusts) observed by the weather sensors 430-$n$ to a computer system 480-1 over one or more networks 490, which may include the Internet in whole or in part. The sets of data 435A-0, 435A-1, 435A-2 are transmitted to the computer system 480-1 at regular intervals of time $\Delta t$, and include information or data regarding mean wind speeds $\mu_W$ and mean wind gusts $\mu_G$, as well as standard deviations of the wind speeds $\sigma_W$ and standard deviations of the wind gusts $\sigma_G$.

For example, the set of data 435A-0 includes mean wind speeds $\mu_W$, mean wind gusts $\mu_G$, standard deviations of the wind speeds $\sigma_W$ and standard deviations of the wind gusts $\sigma_G$ observed at a time $t_0$, while the set of data 435A-1 includes mean wind speeds $\mu_W$, mean wind gusts $\mu_G$, standard deviations of the wind speeds $\sigma_W$ and standard deviations of the wind gusts $\sigma_G$ observed at a time $t_0 - \Delta t$, and the set of data 435A-2 includes mean wind speeds $\mu_W$, mean wind gusts $\mu_G$, standard deviations of the wind speeds $\sigma_W$ and standard deviations of the wind gusts $\sigma_G$ observed at a time $t_0 - 2\Delta t$.

Additionally, as is further shown in FIG. 4A, an external computer system 480-2 provides sets of data 435B-0, 435B-1, 435B-2 regarding predictions of wind flows to the computer system 480-1 over the one or more networks 490. The sets of data 435B-0, 435B-1, 435B-2 represent predictions of the wind flows at intervals of time Δt by the external computer system 480-2, and include information or data regarding mean wind speeds $\mu_W$ and mean wind gusts $\mu_G$, as well as standard deviations of the wind speeds $\sigma_W$ and standard deviations of the wind gusts $\sigma_G$. For example, the set of data 435B-0 includes mean wind speeds $\mu_W$, mean wind gusts $\mu_G$, standard deviations of the wind speeds $\sigma_W$ and standard deviations of the wind gusts $\sigma_G$ that are predicted to be present at the time $t_0$, while the set of data 435B-1 includes mean wind speeds $\mu_W$, mean wind gusts $\mu_G$, standard deviations of the wind speeds $\sigma_W$ and standard deviations of the wind gusts $\sigma_G$ that are predicted to be present at the time $t_0+\Delta t$, and the set of data 435B-2 includes mean wind speeds $\mu_W$, mean wind gusts $\mu_G$, standard deviations of the wind speeds $\sigma_W$ and standard deviations of the wind gusts $\sigma_G$ that are predicted to be present at the time $t_0+2\Delta t$.

Upon receiving the sets of data 435A-0, 435A-1, 435A-2 regarding previously observed wind flows, and the sets of data sets of data 435B-0, 435B-1, 435B-2 regarding predictions of wind flows generated by the external computer system 480-2, the computer system 480-1 may process the sets of data 435A-0, 435A-1, 435A-2, 435B-0, 435B-1, 435B-2 to generate predictions of wind flows at future times. For example, the computer system 480-1 may provide the sets of data 435A-0, 435A-1, 435A-2, 435B-0, 435B-1, 435B-2 as inputs to a machine learning model, such as a gradient-boosted decision tree, and predict one or more wind flows at future times.

As is shown in FIG. 4B, the computer system 480-1 displays a dashboard 460 including information regarding first wind speeds 450-1 and second wind speeds 450-2 predicted based on the sets of data 435A-0, 435A-1, 435A-2, 435B-0, 435B-1, 435B-2. The first wind speeds 450-1 may include speeds of steady winds or gusts at a first future time, e.g., a time during a mission by an aerial vehicle that is expected to begin immediately. The second wind speeds 450-2 may include speeds of steady winds or gusts at a second future time, e.g., a time during a mission that is expected to begin following one or more predetermined events, such as a fulfillment of one or more orders.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
 a computer system having one or more computer processors and one or more data stores; and
 a plurality of weather sensors in communication with the computer system, wherein each of the plurality of weather sensors is provided at one of a plurality of discrete locations in a region, wherein the computer system is programmed with one or more sets of instructions that, when executed, cause the computer system to execute a method comprising:

receiving, from the plurality of weather sensors, a first plurality of sets of data, wherein each of the first plurality of sets of data represents a wind flow sensed by one of the plurality of weather sensors;

generating at least a first histogram based at least in part on the first plurality of sets of data, wherein the first histogram represents a first plurality of wind flows sensed by the plurality of weather sensors;

generating a first Weibull distribution based at least in part on the first plurality of sets of data;

generating a first plurality of Weibull distributions, wherein each of the first plurality of Weibull distributions is generated based on the first Weibull distribution and at least some of the first plurality of sets of data;

selecting a first wind speed based at least in part on the first Weibull distribution and the first plurality of Weibull distributions, wherein the first wind speed corresponds to a threshold percentile of the wind speeds;

determining that an aerial vehicle may execute a mission in the region based at least in part on the first wind speed; and transmitting one or more sets of instructions to the aerial vehicle, wherein the one or more sets of instructions identify a route defined by a plurality of waypoints.

2. The system of claim 1, wherein generating at least the first histogram comprises:

generating at least a second histogram based at least in part on the first plurality of sets of data, wherein the first histogram represents a second plurality of wind flows sensed by the plurality of weather sensors, wherein the first plurality of wind flows are steady wind flows, and wherein the second plurality of wind flows are gusts;

generating a second Weibull distribution based at least in part on the second plurality of sets of data;

generating a second plurality of Weibull distributions, wherein each of the second plurality of Weibull distributions is generated based on the second Weibull distribution and at least some of the second plurality of sets of data; and selecting a second wind speed based at least in part on the second Weibull distribution and the second plurality of Weibull distributions, wherein the second wind speed corresponds to a threshold percentile of the wind speeds, and wherein whether the aerial vehicle may execute the mission in the region is determined based at least in part on the first wind speed and the second wind speed.

3. The system of claim 2, wherein determining that the aerial vehicle may execute the mission in the region based at least in part on the first wind speed and the second wind speed comprises:

determining whether the first wind speed exceeds a first limit on steady wind flows; and determining whether the second wind speed exceeds a second limit on wind gusts.

4. The system of claim 1, wherein each of the plurality of weather sensors comprises:

a housing;
an anemometer;
at least one computer processor;

at least one transceiver configured for wireless communication with the computer system; and a power source, wherein the anemometer, the at least one computer processor, the at least one transceiver and the power source are disposed within the housing, and wherein each of the plurality of weather sensors is mounted to one of:

a building;
a free-standing structure;
a tree; or
a utility system.

5. A method comprising:

receiving, by a computer system over one or more networks, a first plurality of sets of data from a plurality of sensors, wherein each of the plurality of sensors is installed in one of a plurality of discrete locations within a region, and wherein each of the first plurality of sets of data represents a wind speed at one of the discrete locations during a first period of time;

generating, by the computer system, at least a first histogram representing at least some of the first plurality of sets of data;

generating, by the computer system, a first continuous probability distribution based at least in part on the first histogram;

generating, by the computer system, a first plurality of continuous probability distributions based at least in part on the first continuous probability distribution;

selecting, by the computer system, a first wind speed based at least in part on at least one of the first continuous probability distribution or one of the first plurality of continuous probability distributions; and determining, by the computer system, whether an aerial vehicle may execute a mission within at least a portion of the region based at least in part on the first wind speed.

6. The method of claim 5, wherein the first continuous probability distribution is a Weibull distribution.

7. The method of claim 5, wherein generating the first plurality of continuous probability distributions comprises:

resampling, by the computer system, the first continuous probability distribution for a predetermined number of iterations.

8. The method of claim 7, wherein resampling the first continuous probability distribution comprises:

determining, by the computer system, a second plurality of sets of data from the first continuous probability distribution; and generating, by the computer system, at least a second histogram representing at least some of the second plurality of sets of data, wherein a second continuous probability distribution is generated based at least in part on the second histogram, wherein the second continuous probability distribution is one of the first plurality of continuous probability distributions, and wherein the first wind speed is selected based at least in part on the first continuous probability distribution and the second continuous probability distribution.

9. The method of claim 7, wherein selecting the first wind speed based at least in part on at least one of the first continuous probability distribution or one of the first plurality of continuous probability distributions comprises:

determining, by the computer system, a first plurality of wind speeds, wherein each of the first plurality of wind speeds represents a first percentile of wind speeds of one of the first continuous probability distribution or the first plurality of continuous probability distributions; and selecting, by the computer system, one of the first plurality of wind speeds representing a second percentile of the first plurality of wind speeds, wherein the first wind speed is the selected one of the first plurality of wind speeds.

10. The method of claim 5, wherein each of the plurality of weather sensors is mounted to one of:
a building;
a free-standing structure;
a tree; or
a utility system.

11. The method of claim 5, wherein the plurality of sensors comprises a first sensor provided at a first discrete location in the region, a second sensor provided at a second discrete location in the region, and a third sensor provided at a third discrete location in the region.

12. The method of claim 5, wherein generating at least the first histogram comprises:
generating, by the computer system, a second histogram representing at least some of the first plurality of sets of data,
wherein the first histogram represents steady wind flows captured by the plurality of sensors, and
wherein the second histogram represents wind gusts captured by the plurality of sensors.

13. The method of claim 12, further comprising:
generating, by the computer system, a second continuous probability distribution based at least in part on the second histogram and the second plurality of sets of data;
generating, by the computer system, a second plurality of continuous probability distributions based at least in part on the second continuous probability distribution; and
selecting, by the computer system, a second wind speed based at least in part on at least one of the second continuous probability distribution or one of the second plurality of continuous probability distributions,
wherein determining whether the aerial vehicle may execute the mission comprises:
determining, by the computer system, whether the aerial vehicle may execute the mission within at least the portion of the region based at least in part on the first wind speed and the second wind speed.

14. The method of claim 13, wherein determining whether the aerial vehicle may execute the mission within at least the portion of the region based at least in part on the first wind speed and the second wind speed comprises:
determining whether the first wind speed exceeds a first limit on steady wind flows; and
determining whether the second wind speed exceeds a second limit on wind gusts.

15. The method of claim 5, wherein the first plurality of sets of data represent wind occurrences within the region during the first period of time, and
wherein the first histogram is a representation of a distribution of the wind occurrences with respect to a plurality of intervals corresponding to unit speeds.

16. The method of claim 5, wherein determining whether the aerial vehicle may execute the mission within at least the portion of the region comprises:

causing, by the computer system, a display of information regarding at least the first wind speed in a user interface; and
receiving, by the computer system, an interaction with the user interface by an operator of the computer system,
wherein the interaction is one of:
an indication that the aerial vehicle may execute the mission; or
an indication that the aerial vehicle may not execute the mission.

17. The method of claim 5, further comprising:
in response to determining that the aerial vehicle may execute the mission within at least the portion of the region,
transmitting, by the computer system, at least one instruction to execute the mission to the aerial vehicle.

18. The method of claim 5, wherein each of the plurality of sensors comprises:
a housing;
an anemometer;
at least one computer processor;
at least one transceiver configured for wireless communication with the computer system; and
a power source,
wherein the anemometer, the at least one computer processor, the at least one transceiver and the power source are disposed within the housing.

19. An aerial vehicle comprising:
a plurality of propulsion motors, wherein each of the plurality of propulsion motors is configured to rotate a propeller about an axis;
a control system comprising one or more computer processors and a transceiver, wherein the control system is in communication with each of the plurality of propulsion motors, and
wherein the control system is programmed with one or more sets of instructions that, when executed, cause the aerial vehicle to execute a method comprising:
receiving, over one or more networks, a first plurality of sets of data from a plurality of sensors, wherein each of the plurality of sensors is installed in one of a plurality of discrete locations within a region in which the aerial vehicle is located, and wherein each of the first plurality of sets of data represents a wind speed at one of the discrete locations during a first period of time;
generating at least a first histogram representing at least some of the first plurality of sets of data;
generating a first continuous probability distribution based at least in part on the first histogram and the first plurality of sets of data;
generating a plurality of continuous probability distributions based at least in part on the first continuous probability distribution;
determining a first wind speed based at least in part on at least one of the first continuous probability distribution or one of the plurality of continuous probability distributions;
determining that the first wind speed does not exceed a first limit on steady wind flows or a second limit on wind gusts; and
in response to determining that the first wind speed does not exceed the first limit on steady wind flows or the second limit on wind gusts, determining that the aerial vehicle may execute a mission within at least a portion of the region based at least in part on the first wind speed; and operating at least one of the plurality of propulsion motors to cause the aerial vehicle to execute the mission.

20. The aerial vehicle of claim 19, wherein each of the plurality of sensors comprises:

a housing;

an anemometer;

at least one computer processor;

at least one transceiver configured for wireless communication with the computer system; and a power source, wherein the anemometer, the at least one computer processor, the at least one transceiver and the power source are disposed within the housing, and wherein each of the plurality of sensors is mounted to one of:

a building;

a free-standing structure;

a tree; or a utility system.

* * * * *